June 10, 1930.                L. M. ASPINWALL                1,763,120
                            ELECTROPNEUMATIC BRAKE
                              Filed Feb. 14, 1927

WITNESSES:

INVENTOR
Louis M. Aspinwall
BY
ATTORNEY

Patented June 10, 1930

1,763,120

UNITED STATES PATENT OFFICE

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA

ELECTROPNEUMATIC BRAKE

Application filed February 14, 1927. Serial No. 167,906.

This invention relates to braking systems and more particularly to electro-pneumatic braking systems for trains.

The object of the invention, generally stated, is the provision of an electro-pneumatic braking system, or the like, that shall be simple and efficient in operation, and readily and economically manufactured.

A more specific object of the invention is to provide for the simultaneous control of the air pressure in all the brake cylinders of an air-brake system.

Another object of the invention is to provide for the establishment of any predetermined pressure in the brake cylinders of an air-brake system to give any desired braking action.

A further object of the invention is to provide for the indication of the pressure that will be established in a brake cylinder upon the actuation of the brake control lever to a predetermined position.

It is also an object of the invention to provide for automatically establishing a predetermined pressure in a brake cylinder when the control lever of a braking system is actuated to a selected position.

Other objects of the invention will, in part, be obvious, and will, in part appear hereinafter.

The invention, accordingly, is disclosed in the embodiment thereof, shown in the accompanying drawing and comprises the structural features, the combination of elements and arrangement of parts that will be exemplified in the construction hereinafter set forth and the scope of the application of which will be indicated in the claims.

Figure 1:
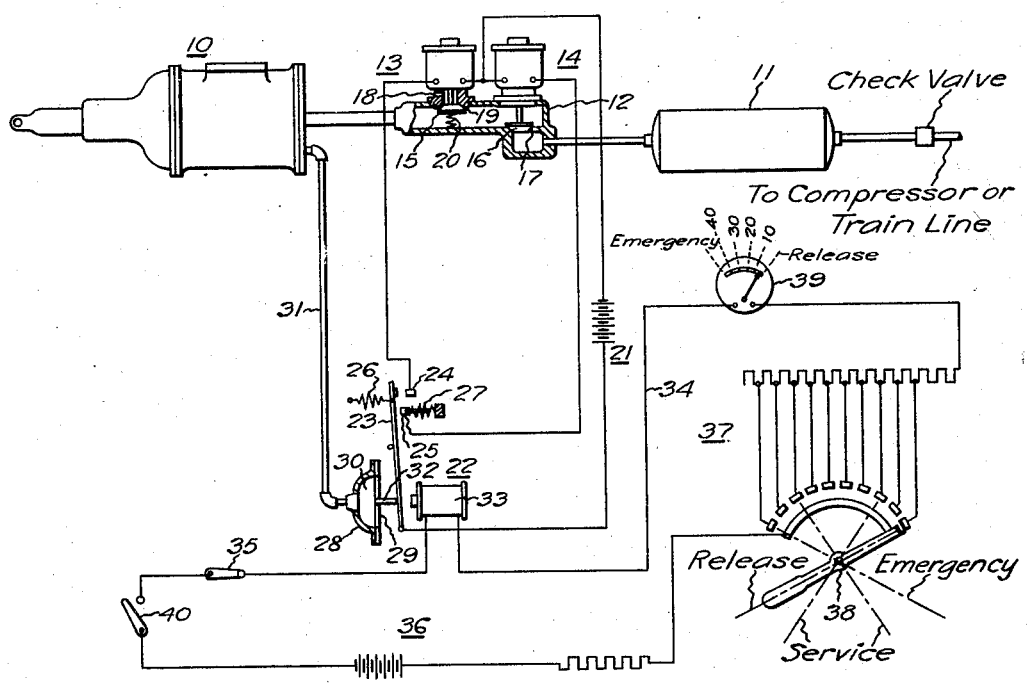
Figure 2:
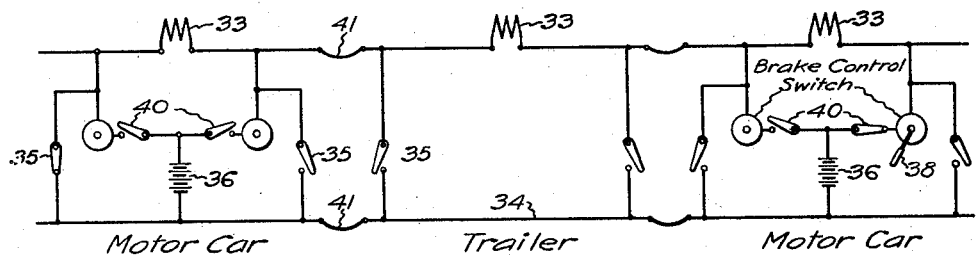

For a fuller understanding of the nature and objects of the invention. reference should be had to the following detailed description taken in conjunction with the accompanying drawing, in which;

Fig. 1 is a diagrammatic view of a braking system constructed in accordance with this invention; and Fig. 2 is a diagram showing the braking system applied to a number of vehicles.

Referring now to the drawings, a brake cylinder 10 of any well-known type may be utilized for actuating a brake shoe (not shown). The brake cylinder 10 may be connected to an auxiliary compressed air reservoir 11, which may be supplied from any suitable source, such as a compressor, (not shown). It will be observed that the auxiliary reservoir 11 is connected to the brake cylinder 10 through an air chest 12.

In order to control the transfer of air to, and the exhaust of air from the brake cylinder 10, the air chest 12 is provided with electromagnetically operated valves 13 and 14. The construction of electromagnetic valves of this type is well known, and it will be readily understood they may be designed to actuate their valve heads in any desired direction. Accordingly, it is thought that it will suffice to point out, that in the embodiment of the invention illustrated, the electromagnetic valves 13 and 14, when energized, are adapted to actuate their respective valve heads 15 and 16 downwardly.

In this particular construction, the valve 14 is utilized for governing the transfer of air from the reservoir 11 to the brake cylinder 10. Accordingly, a valve seat 17. shaped to receive the valve head 16, is provided in the air channel leading through the air chest 12. Therefore, upon the energization of the valve 14, the valve head 16 is projected into position in the seat 17 and the channel between the reservoir 11 and the brake cylinder 10 is closed. When the valve is deenergized, the valve head may be raised by the air pressure.

The valve 13 is disposed to control the exhaust of air through a port 18. As shown, the valve head 15 is disposed in the air chest 12 in alinement with a valve seat 19, which encircles an opening that extends through the wall of the chest 12 and communicates with the port 18. A spring 20 is mounted in the chest for maintaining the valve head 15 in position in the seat 19 when the valve 13 is deenergized. Since a spring 20 capable of lifting the valve head 15 will meet the requirements for strength, it will not seriously impede the operation of the valve 13.

In order to actuate the valves 13 and 14, two local circuits in which a battery 21 is connected, are provided. In this particular case, a storage battery is provided for supplying the electrical energy for actuating the valves, but it will be readily understood that any other suitable source of electrical energy may be utilized.

In this embodiment of the invention, a relay, shown generally at 22, is provided for controlling the actuating circuits of valves 13 and 14. Therefore, one function of the relay is to control the admission of air to and the exhaust of air from the brake cylinder 10.

The relay 22 may be termed a "pressure measuring relay", since, as will be explained hereinafter, it is disposed to respond to changes in pressure in the brake cylinder 10, and to changes in the pull of an electromagnet 33, and accordingly may be utilized to measure a function of the pressure in the brake cylinder.

The construction of the relay 22 will depend to some extent on the operating conditions, but will always embody certain essential features. As the description proceeds the function of the different members of the relay 22 and their disposition will be set forth.

As will be observed, the relay 22 provided in this embodiment of the invention comprises a pivotally mounted armature 23 disposed in alinement with a stationary contact member 24 and with a movable contact member 25. A spring 26 is connected between any fixed support and the armature 23 and normally tends to retain the latter out of engagement with the contact members 24 and 25.

In order to effect the closure of the valve 14 before the opening of the exhaust port 18, the movable contact member 25 is set in advance of the stationary contact member 24. Therefore, when the armature 23 is actuated, the movable contact member 25 is engaged before the stationary contact member 24, thereby establishing the actuating circuit of the valve 14 before the actuating circuit of the valve 13.

A spring 27 is provided for causing the movable contact member 25 to follow the armature 23 through a predetermined distance as it moves away from the contact members 24 and 25, thereby to maintain the actuating circuit of the valve 14 closed until the valve 13 is deenergized and the exhaust port 18 is closed.

In order to provide for the control of the valves 13 and 14 by the operator to permit him to cause the establishment of different predetermined pressures in the brake cylinder, means for actuating the armature 23 that is dependent for its operation upon the pressure in the brake cylinder and the current flowing in a train line circuit 34, is provided. Therefore, by varying the current flowing in the train line circuit, the armature 23 may be actuated to effect a change of pressure in the brake cylinder.

As illustrated, a hollow hemispherical member 28, having a diaphragm 29 extended across its open face, to form a chamber 30, is connected to the brake cylinder 10 by a pipe 31. The diaphragm 29 is preferably made from some resilient metal.

In order to utilize the diaphragm 29 to cooperate in the operation of the armature 23, any suitable connection between them is provided. In this construction a pin 32 is mounted centrally of the diaphragm to extend at right angles thereto. The casing 28 is preferably disposed so that the pin 32 engages the armature 23 close to its pivot point, thereby to give a reasonably long movement of the armature in response to a small movement of the diaphragm, in order to perform the desired switching operations.

With a view to utilizing the current flowing in the train-line circuit, which may be controlled to cooperate in the operation of the armature 23, some such device as an electromagnet 33, may be provided. As illustrated, an electromagnet 33 is connected in the train-like circuit 34 and disposed in alinement with the armature 23. Accordingly, when the electromagnet 33 is energized, it will tend to operate the armature and the pull which it exerts will depend upon the current flowing in the train-line circuit 34.

Ordinarily, multiple-unit trains are provided with a number of train-line conductors that may be utilized for different purposes such as, for example, the control of train-operating apparatus and the like. When it is desired to supply a number of cars from the same circuit, they are equipped with jumpers 41 so that the conductors of the different cars may be connected to establish a continuous circuit throughout the length of the train, in the manner illustrated in Fig. 2. In this particular embodiment of the invention, a switch 35 is provided on each car for completing the train-line circuit when the next car is disconnected from the train.

Any suitable source of electrical energy may be utilized and, in the system illustrated, a storage battery 36 is provided. In order to control the current flowing in the train-line circuit 34, a rheostat 37, which may have any desired number of resistor sections, is utilized. Since the control of the pressure in the brake cylinder 10, as pointed out hereinbefore, depends upon the current flowing in the train-line circuit, a lever 38, provided for operating the rheostat 37, may be called a brake-control lever. The lever 38 is adapted to assume three operative positions, appropriately designated "release", "service" and "emergency".

An ammeter 39 is connected in the train-line circuit 34 for indicating the current. However, this ammeter is calibrated to indicate the pounds pressure in the brake cylinder 10, instead of the number of amperes flowing in the circuit. The calibration of the meter and its function will be more clearly set forth in the subsequent description of the operation of the invention.

In the illustrated embodiment of the invention, a manually operable control switch 40 is shown open, and accordingly, all the circuits are deenergized. Assume now that a vehicle equipped with this type of braking system is to be put into operation, and the switch 40 is closed. If the brake control lever 38 is set in its "release" position, as illustrated, the maximum current will flow in the train-line circuit 34, thereby fully energizing the relay 33. When the relay 33 is energized, the armature 23 is actuated to the right, first into engagement with the movable contact member 25 and then the stationary contact member 24. In this manner, the actuating circuits for the vales 14 and 13 are closed in the order recited, the connection between the auxiliary reservoir 11 and the brake cylinder 10 is also closed and the exhaust port 18 is opened.

It will readily be understood that before a vehicle is put in service, a supply of compressed air is provided to supply the auxiliary reservoir 11, as required. The supply of compressed air for the reservoir 11 may be a main reservoir provided on the train or a compressor that is governed in accordance with well-known principles.

Assume now that it is desired to effect a "service" or other braking action and that the brake control lever 38 is rotated counter-clockwise to the corresponding position, thereby increasing the resistance of the train line circuit and reducing the value of the current. The pull of the relay 33 is thereby diminished, and the armature 23, under the influence of the springs 26 and 27, is rotated counter clockwise about its pivot point, first interrupting the actuating circuit of the valve 13, and later, the actuating circuit of the valve 14. When the valve 13 is deenergized, the spring 20 functions to close the exhaust port 18 by projecting the valve head 15 into its seat 19. Further, upon the deenergization of the valve 14, the valve head 16 is released and is projected out of its seat 17 by the pressure of the compressed air. In this manner, communication is established between the auxiliary reservoir 11 and the brake cylinder 10 and a pressure is immediately built up, causing the application of the brake shoe.

As will be readily understood, when pressure, is built up in the brake cylinder 10, compressed air flows to the chamber 30 and distorts the diaphragm 29, biasing it outward toward the armature 23. Accordingly, there is a cooperative action of the air pressure in the brake cylinder 10 and the diminished pull of the electromagnet 33, tending to actuate the armature 23 against the pull of the spring 26. Therefore, when the pressure in the brake cylinder 10 reaches a predetermined value, the armature 23 will be moved into engagement with the movable contact member 25, which again closes the actuating circuit of the valve 14. As has been pointed out hereinbefore, when the valve 14 is energized, the supply of compressed air to the brake cylinder 10 is cut off. However, sufficient compressed air has been admitted to the brake cylinder to effect the desired braking action.

Further, when any predetermined pressure has been established in the brake cylinder 10 and it is desired to increase the braking action, the brake lever may be actuated to further reduce the current flowing in the train line. Therefore, the armature 23 is again actuated in the manner described, to effect the admission of more air to the brake cylinder 10, and the building up of the pressure required to give the desired braking action.

If for any reason, the brake cylinder becomes leaky and the air pressure is thereby reduced, the pressure in the chamber 30 is accordingly reduced, and the cooperative action of the air pressure in the chamber 30 and the pull of the magnet are insufficient to maintain the armature in engagement with the movable contact member 25, whereby the actuating circuit of the valve 14 is opened. Air is again admitted to the brake cylinder 10 until the desired pressure is provided, when the actuating circuit of the valve 14 will again be interrupted in the manner described. Therefore, it will be evident that the present braking system is adapted for automatic operation to maintain any desired pressure in the brake cylinder.

The calibration of the meter 39 will now be described. Assume that it is desired to build up braking pressures of five pounds, ten pounds and fifteen pounds, etc. in the brake cylinder 10. A pressure gauge may be connected to the brake cylinder and the brake control lever 38 actuated to regulate the flow of current to a value which will give the desired pressure in the brake cylinder. When the whole system has become balanced with 5 pounds pressure in the brake cylinder, the meter may be read and this reading will always indicate 5 pounds pressure in the brake cylinder. In the same manner, the whole scale of the meter may be calibrated, to provide for directly indicating the pressure in the brake cylinder.

When the meter has been calibrated, it may be utilized by the operator to guide him in the setting of the brake control lever 38 to effect the establishment of any desired pressure in the brake cylinder. Assume, for instance, it is desired to apply 10 pounds braking pressure. The operator will actuate his brake control lever 38 until the meter 39 reads 10 pounds and the braking system will automatically function in the manner described hereinbefore to give the desired braking pressure.

If it is desired to reduce the braking pressure, the operation is the reverse of that already described. Assume that the braking pressure is 10 pounds, which is greater than that required under the operating conditions, and that the operator decides to reduce it to 5 pounds. The brake control lever 38 is rotated clockwise, reducing the resistance in the train-line circuit 34 to increase the current flowing in the circuit and to set the meter to indicate 5 pounds pressure. An increase in the current flowing in the train-line circuit increases the pull of the electromagnet 33, thereby actuating the armature 23 to first engage the movable contact member 25 and then the fixed contact member 24. The valve 14 is closed to interrupt the supply of compressed air to the brake cylinder 10 and the valve 13 is opened to permit the exhaust of air from the brake cylinder 10. As the air pressure in the brake cylinder decreases, the cooperative action upon the armature 23 of the air pressure transmitted through the diaphragm 29 will decrease and the armature, under the influence of spring 26, will be withdrawn from the contact member 24. Therefore, the actuating circuit of the valve 13 is interrupted and the exhaust port 18 closed, to provide the desired working pressure.

In case it is required to effect emergency braking, the brake control lever 38 is rotated counter-clockwise to the corresponding limit of its movement, inserting all of the resistance in the train-line circuit. The pull of the electromagnet 33 is reduced to substantially zero and the spring 26 draws the armature 23 out of engagement with the contact members 24 and 25. It will be readily understood that, since the spring 26 is disposed to operate the armature 23 as a lever, it will retain the latter out of engagement with the contact members 24 and 25 against the action of the diaphragm 29 even when subjected to maximum braking pressure.

The above description sets forth a braking system provided with a brake-control lever and means for setting it to develop any predetermined braking pressure in the brake cylinder, together with apparatus adapted to function automatically to maintain the desired braking pressure, when the brake control lever is set. Further, a large number of brake cylinders may be controlled to effect a simultaneous braking action throughout a train.

Since certain changes may be made in the above construction and different embodiments of the invention may be made without departing from the spirit thereof, it is intended that all matter contained in the above description or shown in the accompanying drawing shall be interpreted as illustrative and not in a limiting sense.

I claim as my invention:

1. In an electro-pneumatic braking system, in combination, a brake cylinder, a source of supply of compressed air for the brake cylinder, electromagnetic valves interposed between the brake cylinder and the source of supply of compressed air, for regulating the pressure in the brake cylinder, independent circuits for actuating said valves and means dependent on the air pressure in the cylinder for controlling the energization of the circuits to maintain a predetermined pressure in the brake cylinder.

2. In an electro-pneumatic braking system, in combination, a brake cylinder, a source of supply of compressed air for the brake cylinder, a train-line circuit, means for causing current of different values to flow in the train-line circuit, means dependent upon the current flowing in the train-line circuit and the pressure in the brake cylinder for governing the transfer of air to, and the exhaust of air from, the brake cylinder, and means actuated by the current flowing in the train-line circuit for indicating the pressure that will be established in the brake cylinder after a variation of the current flowing in the train-line circuit.

3. In an electro-pneumatic braking system, in combination, a brake cylinder, a source of supply of compressed air for the brake cylinder, a train-line circuit, means for causing current of different values to flow in the train-line circuit, means dependent upon the current flowing in the train-line circuit to govern the transfer of compressed air to, and the exhaust of compressed air from, the brake cylinder, thereby to establish any predetermined pressure in the brake cylinder, and means actuated by the current flow in the train-line circuit for indicating the pressure that will be established in the brake cylinder upon the flow of currents of different value.

4. In an electro-pneumatic braking system, in combination, a brake cylinder, a source of supply of compressed air for the brake cylinder, electromagnetically actuated valves for controlling the transfer of air to, and exhaust of air from, the brake cylinder, independent actuating circuits for each valve, switching means for controlling the valve circuits, a train-line circuit, means for causing currents of different value to flow in the train-line circuit, and means dependent upon the current flowing in the train-line circuit co-operative with means actuated by the pressure in the brake cylinder for actuating the switching means to govern the operation of the electromagnetically actuated valves, thereby to control the pressure in the brake cylinder.

5. In an electro-pneumatic braking system, in combination, a brake cylinder, a source of supply of compressed air for the brake cylinder, electromagnetically actuated valves for controlling the transfer of air to, and exhaust of air from, the brake cylinder, independent actuating circuits for each valve, switching means for controlling the valve circuits, a train-line circuit, means for causing currents of different value to flow in the train-line circuit, means dependent upon the current flowing in the train-line circuit co-operative with means actuated by the pressure in the brake cylinder for actuating the switching means to govern the operation of the electromagnetically actuated valves, thereby to control the pressure in the brake cylinder, and means actuated by the current flowing in the train-line circuit to permit the selection and establishment of different predetermined pressures in the brake cylinder.

6. In an electro-pneumatic braking system, in combination, a brake cylinder, a source of supply of compressed air for the brake cylinder, valves for governing the transfer of air to, and the exhaust of air from, the brake cylinder, means for actuating said valves independently, a train-line circuit, means for controlling the current flowing in the train-line circuit, and means dependent upon the current flowing in the train-line circuit for governing the operation of said valves whereby different predetermined pressures may be established in the brake cylinder.

7. In an electro-pneumatic braking system, in combination, a brake cylinder, a source of supply of compressed air for the brake cylinder, electro-magnetic valves for controlling the supply of air to, and the exhaust of air from, the brake cylinder, means for energizing the electromagnetic valves, means responsive to the pressure in the brake cylinder for controlling the energization of the electromagnetic valves, and electromagnetic means disposed to act upon the control means for said electromagnetic valves to effect changes in pressure in the brake cylinder.

8. In an electro-pneumatic braking system, in combination, a brake cylinder, a source of supply of compressed air for the brake cylinder, electromagnetic valves for controlling the supply of air to, and the exhaust of air from, the brake cylinder, means responsive to the pressure in the brake cylinder for effecting the operation of the electromagnetic valves in a predetermined sequence to establish a predetermined pressure in the brake cylinder, electromagnetic means cooperative with the valve control means to vary the pressure in the brake cylinder, and means for varying the energization of said electromagnetic means for selecting the pressure to be established in the brake cylinder.

In testimony whereof, I have hereunto subscribed my name this 9th day of February, 1927.

LOUIS M. ASPINWALL.